United States Patent [19]

Nelson et al.

[11] 4,362,539

[45] Dec. 7, 1982

[54] FOAM SPLITTER

[76] Inventors: Eugene D. Nelson, 9532 La Canada Way, Sunland, Calif. 91040; Ivan Rasovich, 2653 Timberlane Dr., La Crescenta, Calif. 91214

[21] Appl. No.: 191,402

[22] Filed: Sep. 29, 1980

[51] Int. Cl.³ .............................................. B01D 19/00
[52] U.S. Cl. ...................................... 55/178; 55/203; 210/242.1
[58] Field of Search .................... 55/36, 87, 178, 203; 210/219, 242.1, 242.2, 242.3, 242.4; 261/92

[56] References Cited

U.S. PATENT DOCUMENTS

| | | | |
|---|---|---|---|
| 1,906,526 | 5/1933 | Bradford | 55/178 |
| 2,098,152 | 11/1937 | Kessener | 261/92 X |
| 3,169,841 | 2/1965 | Weis | 55/178 X |
| 3,284,993 | 11/1966 | Sebald et al. | 55/178 |
| 3,322,410 | 5/1967 | Ahlenius | 210/242.2 X |
| 3,617,555 | 11/1971 | Ginsburgh et al. | 210/242.4 X |
| 3,799,515 | 3/1974 | Geerlings | 261/92 |
| 4,175,041 | 11/1979 | Drnevich et al. | 55/178 X |

FOREIGN PATENT DOCUMENTS 612704  6/1978  U.S.S.R. .............................. 55/178

*Primary Examiner*—Robert H. Spitzer

[57] ABSTRACT

Apparatus for breaking foam on the surface of a liquid, such as in a sewage aeration tank is disclosed. A rotating cylindrical brush is mounted in a housing at the water surface with the brush rotation bringing foam under an edge of the housing into contact with the brush and with the brush fingers splitting the bubbles and compressing the resultant liquid into the water. The apparatus includes floats for supporting the housing and brush and a pivoting frame for supporting the housing and brush in position in the tank.

4 Claims, 5 Drawing Figures

U.S. Patent  Dec. 7, 1982  Sheet 1 of 2  4,362,539
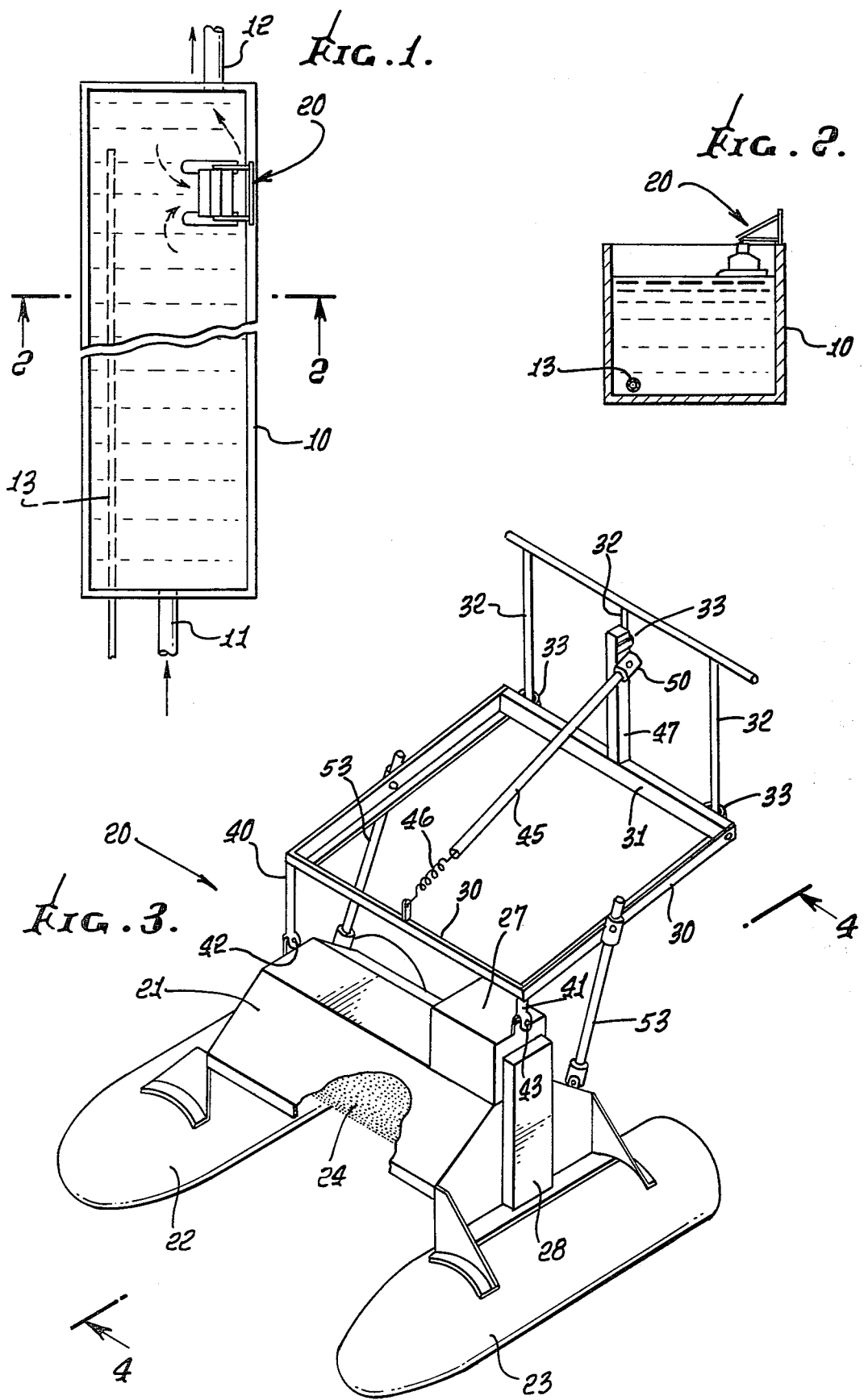

FOAM SPLITTER

BACKGROUND OF THE INVENTION

This invention relates to control of foam in liquid treatment, such as foam occurring in aeration tanks of sewage treatment plants. The invention more particularly relates to apparatus for breaking the foam bubbles and thereby reducing the foam to a liquid.

The foam in treatment plants today is different than it was years ago. The foam of the sixties was caused by a circular molecular detergent chain which was not readily biodegradable and which would continue to build up on the aeration tanks until in some cases, the foam would break loose in a moderate breeze and float through the air. This light consistency was caused by the chemical base of the detergents which the manufacturers were able to correct in 1963, which occurred after a short but very concentrated industry-wide study to find a biodegradable substitute detergent.

Most secondary treatment plants entered into an era of relief following the development of the long chain detergents. Those plants, however, which had special industrial or cannery liquid waste discharges were not relieved, and in fact, their problems continued but in a cyclic manner. It was common to ignore these cyclic foam problems by taking action whenever they occurred. This problem was compounded by the large number of secondary plants which were constructed in the seventies, and many of the plant designers were unaware of the subtle differences that the proposed plant influent had from the norm. The resulting periodic foam problems were generally attacked by installing foam spray systems. These systems had reasonable success against the lighter foams but the heavier foams often rose right up over the spraying water and flowed over the walkways.

Foam in some secondary treatment plants was periodically rising up like overworked bread dough until it covered the walkways and ran into the galleries. The work required to clean up the mess became significant. In some instances, the foam was controlled to a degree, with the use of defoamant chemicals. However the cost of chemicals was prohibitive in many installations. Also some plants could not use chemicals because the plants had several strains of filamentous biomass, entering from fish canneries, which were not affected by chemicals.

To avoid the use of expensive chemicals, a vacuum system was tried, consisting of a 6 inch plastic pipe header at the downstream end of each aeration tank to vacuum up the foam and discharge the liquid residual into a sewer line. One such system was installed in a full scale test program which revealed that a problem existed in the discharge of the foam into the sewer pipes. Unless the air was removed from the foam, it would not readily flow into the sewer, seriously reducing the rate of removal. Also the power requirement for the vacuum system was substantial.

An article in the November, 1977 issue of the "Water Pollution Control Federation Journal" by K. S. Ng and L. Gutierrez focused on the foam in the paper industry. These authors determined that the important factors in mechanical foam breaking are suction, shear and centrifugal forces. They recommended three blade, 15 to 31 cm diameter, vaned turbines operating in the range of 600 to 1400 RPM. These turbines reduced the heavy foam from paper pulp wastes using a tip speed of about 1400 Cm/sec. While satisfactory for their intended purpose the turbines are relatively expensive both in initial cost and in operating cost.

Accordingly, it is an object of the present invention to provide a new and improved foam breaker which will satisfactorily reduce foam in aeration tanks while being simple in design and operation and being inexpensive to build and install and operate.

It is a particular object of the invention to provide a new and improved foam breaking system based on mechanically shearing or bursting of foam bubbles. A further object is to provide a foam breaker which can be utilized to break the bubbles in the foam in the aeration tank itself, allowing liquified foam to flow from the aeration tank into subsequent treating tanks, such as a sedimentation tank while the liquified foam is still in suspension. An additional object of the invention is to provide a foam breaker which is self-feeding so that additional energy for feeding is not required.

It is a particular object of the invention to provide a foam breaker which does not utilize vacuuming or chemicals or turbines.

An additional object of the invention is to provide such a foam breaker which can be floated directly on the surface of the tank containing the foam. An additional object is to provide such a foam breaker which can be mounted on the wall or railing around the tank and which can be readily moved as desired.

These and other objects, advantages, features and results will more fully appear in the course of the following description.

SUMMARY OF THE INVENTION

The preferred embodiment of the invention for breaking foam on the surface of a liquid includes a downwardly opening housing, a splitter member mounted in the housing for rotation about a generally horizontal axis with the splitter member including a plurality of circumferentially disposed radially extending fingers, a drive system for rotating the splitter member, and a suspension arrangement for supporting the housing and the splitter member at the surface of the liquid. The splitter member preferably is a bristle brush with rows of bristles disposed axially or helically, and with open spaces between the rows. The suspension preferably includes floats positioned at opposite ends of the rotating splitter member to support the apparatus on the surface of the liquid and also provide for guiding the foam into the rotating member. The suspension may also include a pivoting frame for attaching the apparatus to the wall or rail of a tank for maintaining the apparatus in position.

BRIEF DESCRIPTION OF THE DRAWING

FIG. 1 is a plan view of an aeration tank illustrating the installation of a foam breaker incorporating the preferred embodiment of the invention;

FIG. 2 is a sectional view taken along the line 2—2 of FIG. 1;

FIG. 3 is an enlarged isometric view of the foam breaker of FIG. 1;

DESCRIPTION OF THE PREFERRED EMBODIMENTS

A typical sewage aeration tank 10 is shown in FIGS. 1 and 2, with an inlet line 11 at one end of the tank and an outlet line 12 at the opposite end of the tank. An air line 13 extends along the bottom for the length of the tank. Air is pumped into the line 13 and exits through a plurality of openings along the line, bubbling up through the liquid in the tank. This aeration process results in substantial quantities of foam on the surface of the liquid in the tank. A foam breaker 20 is positioned at the surface of the liquid, usually adjacent the outlet with the foam being drawn into the foam breaker and with liquified foam leaving the foam breaker moving toward the outlet, as indicated by the dash line arrows in FIG. 1.

Figure 4:
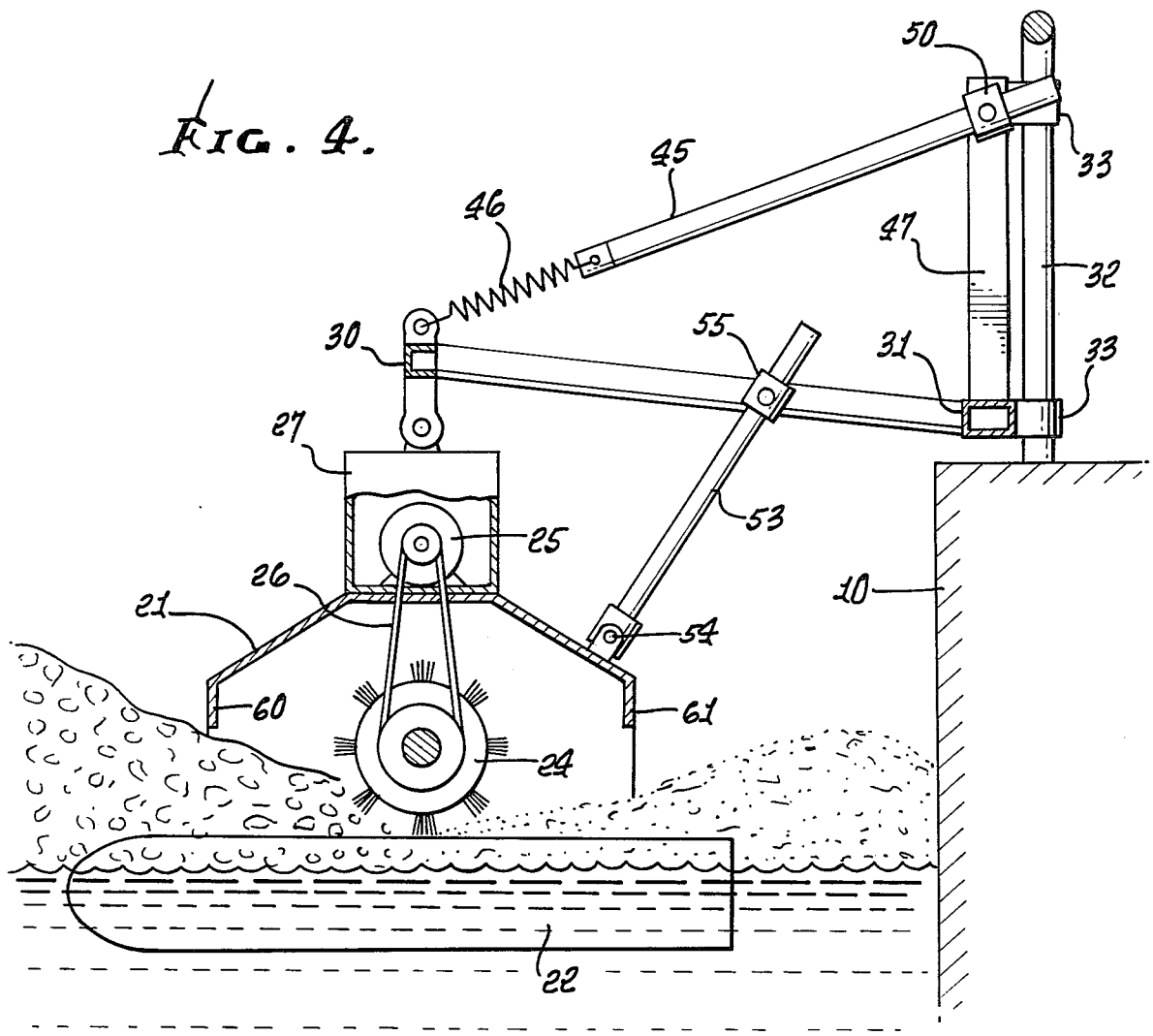
FIG. 4 is a sectional view taken along the line 4—4 of FIG. 3.

The preferred embodiment of the foam breaker 20 is shown in FIGS. 3 and 4 and includes a housing 21 supported on floats 22, 23. A splitter member, typically a brush 24, is mounted in the housing for rotation about an axis generally parallel to the surface of the water on which the foam breaker is positioned. The brush is driven by a motor 25 and drive belt 26, with the motor and belt enclosed in housings 27, 28, respectively.

The foam breaker may be positioned in the tank by means of a U-shaped frame 30 pivotally mounted on a beam 31. The beam in turn is designed for mounting on the edge of the tank, and in the embodiment disclosed, is attached to posts 32 of a fence along the edge of the tank by clamps 33. Alternatively, the beam 31 could be directly attached to the edge of the tank. The edge of the frame opposite the beam 31 is connected to the housing 21 by arms 40, 41 and pivot pins 42, 43, respectively.

A lifting force may be applied to the housing by means of a bar 45 and spring 46 connected between the frame 30 and a post 47 projecting upward from the beam 31. The post 47 may also be clamped to a post of the fence if desired. The bar 45 is mounted in a clamp 50 which pivots in the post 47 and which provides for adjusting the position of the bar 45 relative to the pivot point.

Additional stabilizer bars 53 are connected between the frame 30 and the housing 21. Each bar 53 is pivotally connected to the housing by a pin 54 and is connected to the frame 30 by a pivoting clamp 55 similar to the pivoting clamp 50.

This suspension sytem provides for control of the position of the drum with respect to the surface of the water and also serves to maintain the foam breaker in position on the surface.

Figure 5:
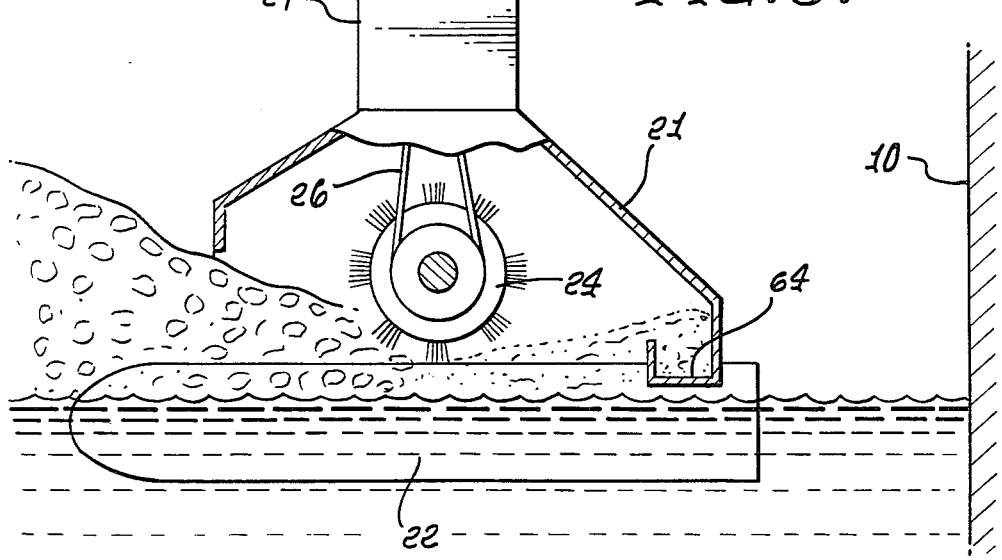
FIG. 5 is a view similiar to that of a portion of FIG. 4, showing an alternative embodiment of the invention.

In operation, rotation of the cylindrical brush 24 draws foam into the space between the floats 22, 23 under the housing 21. The bristles of the rotating brush break the bubbles, liquifying the foam, and tend to compress the liquid foam into the water. The liquified foam exits along the surface of the water and is drawn into the outlet of the tank. The inlet skirt 60 and the outlet skirt 61 of the housing 21 can be made shorter or longer to control foam and spray movement as desired. In the alternative embodiment of FIG. 5, a collection trough 64 is provided at the outlet side of the housing 21. With this configuration, the liquified foam is trapped by the housing and collected in the trough 64 after which it may be dumped into the tank at a desired location or may be directed away from the tank through an appropriate pipeline, as desired.

By way of example, a typical aeration tank may be 25 feet wide, 300 feet long, and 15 feet deep. A foam breaker for use in such an installation may have a brush 3 feet long and 1 foot in diameter. The bristles may be made of polypropylene or nylon or wire and typically are in the order of 0.060 inches in diameter and 3 to 4 inches long. The brush construction is conventional, with the bristles being set in eight rows spaced around the periphery of the core, with spaces between the rows. In the example given herein, the rows are axial but could be helical or otherwise as desired.

The overall width of the foam breaker utilizing this brush is about 60 inches with a front to back distance of about 41 inches. A variable speed drive is preferred, so that the brush rotation speed can be adjusted for optimum performance. It has been determined that a rotational speed of about 450 rpm is suitable, utilizing a motor with one to one and one-half horsepower. This is in comparison to the requirement of a 25 horsepower motor for the previously described vacuum system operating with the same size tank.

When operating the brush under heavy load conditions, where the foam level fills up the entire entrance area, the capacity of the unit exceeded 3000 cu. ft. per hour. The velocity of the foam entering the foam breaker under these conditions was greater than one foot per sec. when the brush is located about one inch above the water surface. The action which takes place under these conditions is the breaking of the bubbles of the foam by the bristle tips and the compression of the foamate (liquified foam) into the water surface. The foamate exiting the rear of the unit shows a turbulent liquid with virtually no bubbles remaining. The foam breaker has the additional feature of proportional output regulation. At foam thickness of 12 in. or more, the apparatus operates at the maximum capacity. As the foam thickness is reduced below 12 in., the output is proportionately reduced, which is accompanied by a reduction of motor load, evidenced by a drop of motor amperage and less energy use.

We claim:

1. In an apparatus for breaking foam on the surface of a liquid, the combination of:
    a downward opening housing;
    a splitter member mounted in said housing for rotation about a generally horizontal axis, said splitter member including a plurality of radially extending circumferential disposed fingers;
    drive means for rotating said splitter member; and
    suspension means for supporting said housing and splitter member at the surface of a liquid;
    said suspension means including:
    a frame having first and second edges;
    means for pivotally mounting said frame to said housing at said first edge;
    means for pivotally mounting said frame to a wall structure at said second edge;
    a stabilizer bar pivotally mounted to said housing below said first edge and to said frame between said first and second edges; and
    a resilient member connected between said frame at said first edge and the wall structure.

2. An apparatus as defined in claim 1 wherein said suspension means includes means for adjusting the length of said stabilizer bar between said housing and frame.

3. An apparatus as defined in claim 1 wherein said suspension means includes flotation means with said housing mounted thereon.

4. In an apparatus for breaking foam resting on the surface of a liquid, the combination of:
a support member;
a splitter member mounted in said support member for rotation about a generally horizontal axis, said splitter member including a plurality of radially extending circumferentially disposed fingers;
drive means for rotating said splitter member; and
suspension means for positioning said support member and splitter member at the surface of a liquid, and including
a frame having first and second edges,
means for pivotally mounting said frame to said support member at said first edge,
means for pivotally mounting said frame to a wall structure at said second edge,
a stabilizer bar pivotally mounted to said support member below said first edge and to said frame between said first and second edges, and
a resilient member connected between said frame at said first edge and the wall structure.

* * * * *